Feb. 28, 1939.　　　　C. G. KELLER　　　　2,148,755
BRAKE DRUM
Filed April 12, 1935　　　2 Sheets-Sheet 1
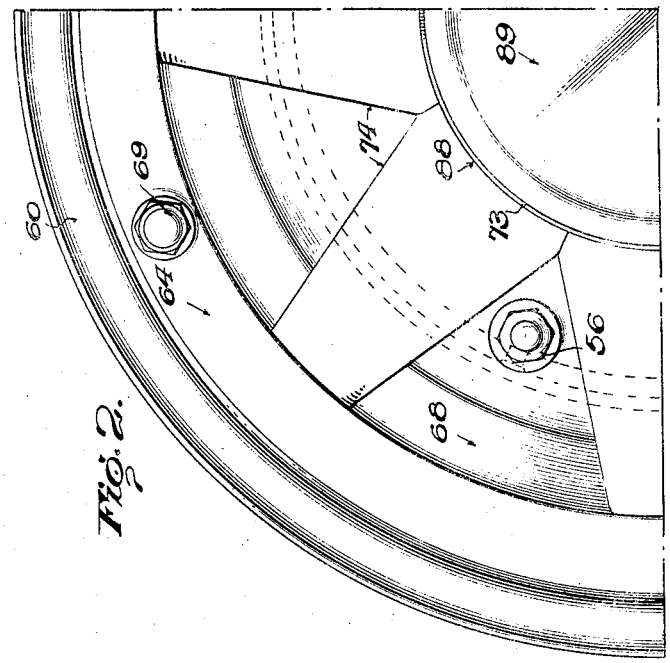
Inventor
Charles G. Keller
By F. P. Keiper
Attorney

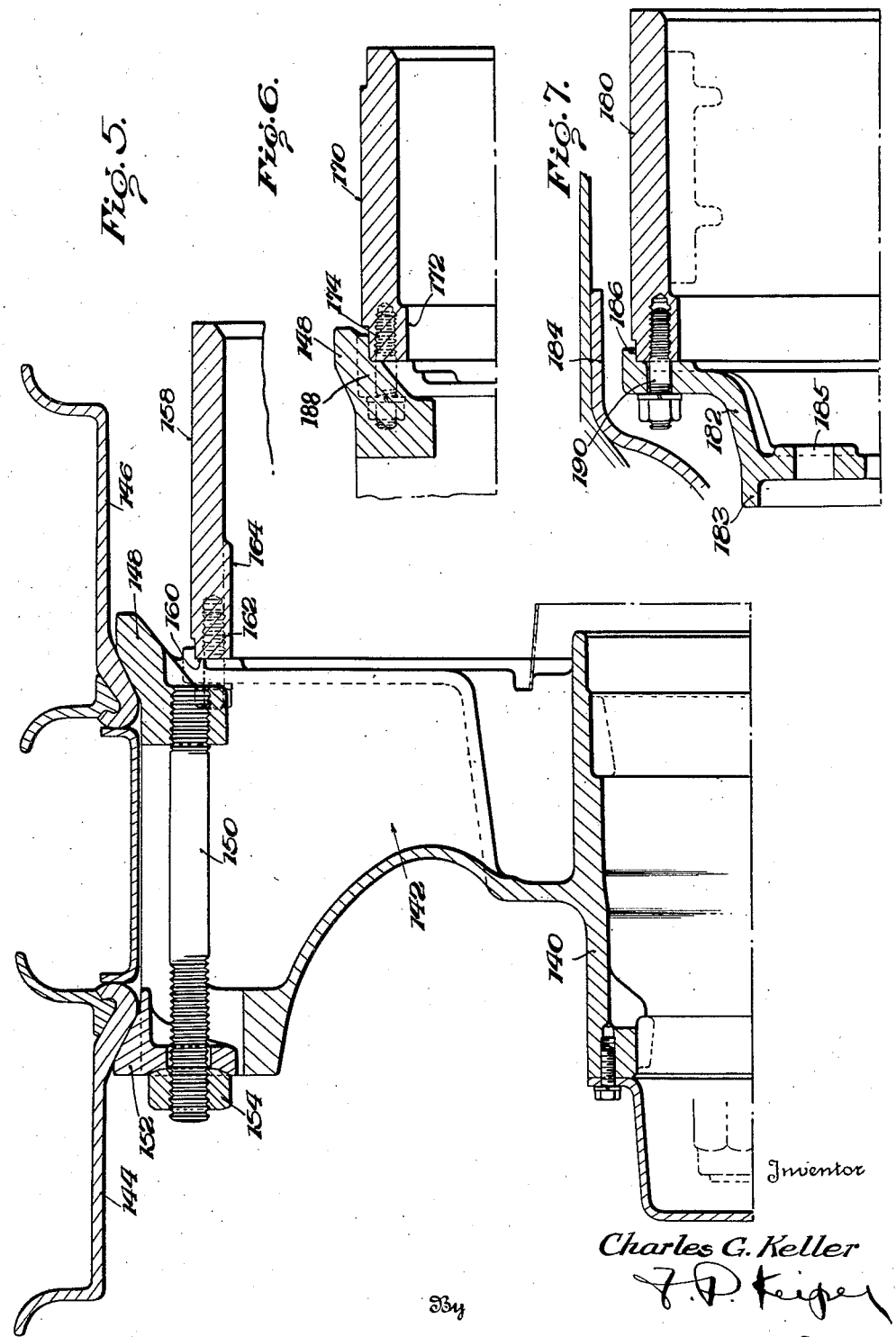

Patented Feb. 28, 1939

2,148,755

UNITED STATES PATENT OFFICE 2,148,755

BRAKE DRUM

Charles G. Keller, Hyde Park, N. Y.

Application April 12, 1935, Serial No. 16,095

16 Claims. (Cl. 188—218)

This invention relates to a vehicle brake drum and wheel construction and more particularly one in which the brake drum is of composite construction and part of which forms a supporting hub structure for a demountable wheel. The composite construction of the braking drum in combination with the wheel makes possible the use of cast iron for the braking flange which material, especially in its centrifugally cast form, is highly efficient and smooth for vehicle braking. The wheel construction also is so associated with the braking flange that torque is directly transmitted thereto resulting in an efficient structural organization.

Accordingly an object of the invention is to provide a composite brake drum structure and wheel organization wherein the cast iron braking flange is secured to the drum head by novel fastening means.

Another object of the invention is to provide a composite brake drum structure and wheel organization wherein the brake drum is separate from but secured to the wheel structure and wherein the fastening means securing the drum to the wheel also forms a part of the fastening means for the demountable part of the wheel.

A further object of the invention is to provide means for securing a cast brake drum to a drum head, which means shall be safe, permanent and secure.

A still further object of the invention is to provide a composite brake drum structure wherein the braking flange is detachably secured to the drum head whereby replacements can be readily effected.

Yet another object of the invention is to provide, in conjunction with a composite hub and braking flange structure, a demountable wheel carried and supported by the structure in a novel improved manner.

Still further objects of the invention have to do with the novel features of the wheel structure.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein like reference numerals indicate like parts:

Fig. 1 illustrates a section taken through the wheel and braking flange organization taken on a radial plane;

Fig. 2 is a front elevation of a quadrant of the wheel;

Fig. 3 is a section through a modified drum structure;

Fig. 4 is a section through a further modified drum structure;

Fig. 5 is a section taken on a radial plane through a heavy dual tire wheel with heavy composite brake drum structure;

Fig. 6 is a section through a modified form of the drum structure of Fig. 5, and Fig. 7 is a section through a composite drum structure unit adapted for attachment to a wheel and as a substitution for conventional drums.

Referring more particularly to Fig. 1, wherein is shown a form of wheel and composite brake drum organization, a generally cylindrical hub member 20 is provided near one end thereof with a main wheel support flange 22, the latter acting also as a brake drum supporting head. On its front face the flange is provided with an annular step or shoulder 24 adapted to support and guide the mounting of the demountable portion of the wheel structure hereinafter referred to in detail. The rear face of the flange 22 is preferably finished for a short space 26 near the periphery thereof and provided with a rearwardly turned piloting flange 28.

An annular cylindrical braking drum 30 which may be of cast iron or other material and if the former, preferably centrifugally cast, is finished along its inner surface 32 to provide a smooth braking surface, and secured and piloted at its inner edge against the finished portion 26 of the support flange 22, and piloting flange 28 which latter assures centering. At its outer edge the drum may be provided with an annular strengthening flange or ring 34 which may be shrunken or otherwise secured to the end of the brake drum, the latter being preferably provided with an annular recess 36 to receive the ring.

Since in service any braking drum is alternately subjected to heating and cooling and consequent expansion and contraction relative to whatever supporting means are provided therefor, it has become a problem to provide a satisfactory composite drum, particularly where the drum is cast iron and not encased within a shell.

Novel means for accomplishing such a satisfactory structure is shown in Fig. 1 wherein L-shaped rivets 40 are employed. The rivet, as illustrated, comprises a body portion 42 axially extending and a radial-extending shank portion 55

44. In use, the axial-extending body portion 42 forms a head for the shank portion 44 which is seated in an aperture 46 in the drum 30 and riveted over as at 48. The body portion of the rivet is preferably thereafter seated in an aperture 50 in the flange 22, and riveted as at 52, both riveted parts 48 and 52 being preferably countersunk to provide a smooth finish. It will be readily observed that in the present instance the brake drum secured to the shank 44 forms a head for the body portion 42 of the rivet when secured in place by the riveted portion at 52. The body portion of the rivet may be extended as shown to provide a threaded shank portion 54 for the reception of a demountable wheel and removable screw cap nut 56. It will, of course, be understood that a plurality of the rivets described are to be arranged around the drum preferably in equally spaced relation and are sufficiently short so as to leave plenty of friction surface unobstructed by the rivets.

A demountable wheel structure adapted for mounting on the hub and flange member is illustrated in Fig. 1 and comprises a pair of rim members 60 and 62 having central flanges 64 and 66 adapted to be secured together to provide a tire supporting rim structure capable of disassembly for facile removal and replacement of a tire. A main supporting wheel disc 68 is secured to the flanges of the rim members by means of bolts 67 and cap nuts 69 arranged for quick disassembly. The wheel disc 68 is provided with holes 70 adapted for registry with the threaded shank portions 54 of the brake drum rivets 40 and has a central aperture 71 and outturned flange 73 therearound adapted to seat on and engage the annular step or shoulder 24 heretofore referred to in connection with the wheel support flange 22.

For further strengthening the wheel structure, a member 75 having a central disc structure 72 and spokes 74 radiating therefrom is seated on the hub in a reduced diameter portion 76 thereof near the front end thereof, the central disc structure being reinforced by annular disc members 78 and 80 on either side of the disc portion 72, the reinforcing members being secured in place by rivets 82 passing through the three thicknesses. The inner edges of the reinforcing members are outwardly flanged as at 84 and 86 to provide a foot or bearing surface on the hub, and an annular toe for engagement with a large nut 87 threaded upon the reduced diameter portion of the hub. The outer edge of the reinforcing plate 80 is inwardly flanged at 81 forming on the outside thereof a support for the inner ends of the spokes 74, and a cup on the inside thereof for receiving a substantially cylindrical brace sleeve 88 which extends lengthwise of the wheel and is supported at its remote end on the flange 73 of the disc 68.

Also secured beneath the rivets 82 is an annular shelf like member 83 which is adapted to support a large hub cap 89 enclosing the end of the hub and nut 87. A grease retaining cap 90 is secured in the end of the hub in any preferred manner.

Various means may be employed for securing the brake drum to its head, and in Figs. 3 and 4 two modifications of the form shown in Fig. 1 are illustrated. In Fig. 3 the drum head 100 is provided with a finished portion 102 and annular shoulder 104 into which is piloted the edge of a drum member 106. To secure the parts together an annular ring 108 formed to provide an annular heel 110 along its outer edge is provided, the inner edge of which is adapted to be snapped into an annular recess 112 in the outer surface of the drum. A series of bolts or other fastening means 114 are provided to clamp the ring to the drum head and secure the drum in tight engagement with the drum head. It will be readily understood that the annular ring 108 will be of sufficient strength to carry the load required but in assembly may be capable of being sufficiently dished to snap into the annular groove 112 in the drum exterior, or may be split.

In Fig. 4 a slightly different arrangement is illustrated wherein a split ring is employed. As illustrated, the drum head 120 is provided with an annular recess 122 with a shoulder 124 for piloting an edge of the brake drum 126. An annular groove 128 receives a ring 129 split in the manner of a piston ring as shown at 130, which ring is secured by fastening means such as bolts 132 passing through apertures in the ring corresponding to drum head apertures. The presence of a plurality of bolts spaced around the ring, several of which are adjacent the split in the ring, prevent the ring from becoming displaced, since the bolts when inserted prevent radial movement of the ring out of the groove.

In either modification of Figs. 3 and 4 the rings 108 and 129 should preferably be keyed to the brake drum in some suitable manner as by welding or brazing or by a mechanical lock. A weld, for example, is illustrated at 113.

Illustrated in Figs. 5, 6 and 7 are examples of a heavier wheel construction employing a composite brake drum structure. Referring to Fig. 5 the hub 140 is shown with a wheel structure 142, integral therewith for carrying a pair of spaced tire rims 144 and 146. For this purpose the wheel is provided at the back side thereof with an annular rim engaging and supporting portion 148 into which is threaded at spaced points studs 150 each of which carry at the front of the wheel rim engaging lugs 152 and nuts 154. The rims 144 and 146 with a spacer are carried and clamped between the lugs 152 and annular rim supporting portion 148. On the rear side of the wheel and spaced radially inward slightly from the rim is carried a braking drum 158, the inner edge of which is seated in a plurality of finished shouldered portions or chairs 160 spaced around the wheel. Bolts 162 passing through the shouldered portions or chairs are threaded into a thickened annular portion 164 of the drum and adapted to secure the drum rigidly in position against the wheel.

Fig. 6 is illustrative of a modification of Fig. 5 wherein the drum 170 with its thickened portion 172 for receiving the threaded fastening means 174 is secured immediately to the annular rim engaging portion 148 of the wheel. In Fig. 7 the drum 180 is illustrated as being carried from an overhanging annular extension 182 which can be assembled to the wheel member, the same being provided with a piloting flange 183 and stud holes 185 for convenient mounting. Such an arrangement permits of the support of the largest permissible drum which can be nested within the adjacent wheel tire rim structure represented at 184. The drum member is piloted against a flange 186 on the drum head member 188 carried by the overhanging annular extension, and is secured in place by a series of studs 190.

Although several modifications of parts of the invention have been illustrated and described, it is to be understood that the invention is not to be limited thereto but may be embodied in other mechanical arrangements and forms. For example, the various features of any of the modifications might be substituted for those of the other modified arrangements. As such other changes in the construction and arrangement may be made without departing from the spirit of the invention as will be apparent to those skilled in the art, reference will be had to the appended claims for a definition of the limits of the invention.

What is claimed is:

1. A composite brake drum comprising a cylindrical drum part, a drum head part, and rivet means extending radially through said cylindrical drum part and axially through said drum head part securing said parts together immediately adjacent the outer edge of said head and the adjacent edge of said drum.

2. A composite brake drum comprising a cylindrical annular drum part thickened radially adjacent along one end and having an inner cylindrical braking surface extending substantially the entire width of the drum, a drum head part adapted to be secured against the thickened end, an annular shoulder on the head part closely embracing and in contact with one side of said drum and centering the same on the head part, and fastening means passing axially through the head part and threaded in the thickened portion of the drum part said fastening means arranged on a bolt circle of greater diameter than the inner braking surface of the drum.

3. A composite brake drum comprising a cylindrical drum part, a drum head part, an annular groove in a cylindrical face of said drum part, a ring seated in said groove, and means securing said ring to said head.

4. A composite brake drum comprising a cylindrical drum part, a drum head part having an annular shoulder adapted to fit against an edge of the drum part and embrace one side thereof, an annular groove in the drum part, and means seated in the groove and fastened to the head securing the parts together.

5. A composite brake drum comprising a cylindrical drum part, a drum head part having an annular shoulder adapted to fit against an edge of the drum part and embrace one side thereof, an annular groove in the drum part, a split ring seated in said groove, and means for securing said ring to the head for securing the parts together.

6. A composite brake drum comprising a cylindrical annular drum part, a drum head part having an annular shoulder adapted to fit against an edge of the drum part and embrace one side thereof, an annular groove in the drum part, a ring seated in said groove, said ring and drum having means securing them against relative rotation, and fastening means securing said ring to the head part.

7. A composite brake drum comprising a cylindrical annular drum part, a drum head part adapted to fit against an edge of the drum part, an annular groove in the drum part, a ring seated in said groove, said ring and drum having means securing them against relative rotation, and fastening means securing said ring to the head part.

8. A composite brake drum comprising a head part, a drum part and L-shaped rivet means passing through each and securing the parts together.

9. A composite brake drum comprising a head part having an annular shoulder, a drum part having an edge seated against said head part and closely embraced by said shoulder, spaced rivet means having a body portion secured in the head part immediately adjacent the drum part, said rivet means having a shank portion extending at right angles to the body portion, said shank portion being riveted to the drum part.

10. A composite brake drum comprising a head part, a drum part adapted to be secured against the head part, a short axially-extending shoulder on the head part closely engaging and piloting the drum part on one side thereof, and separate fastening means for securing the parts rigidly together having an L-shaped section on the other side for securing the drum to the head.

11. A composite brake drum comprising a head part, a drum part adapted to be secured against the head part, a short axially-extending shoulder on the head part closely engaging and piloting the drum part, and separate fastening means for securing the parts rigidly together having an L-shaped section thereon for securing the drum to the head.

12. An L-shaped rivet comprising a substantially cylindrical body portion and a substantially cylindrical shank portion extending at right angles thereto near the end of the body portion.

13. A braking flange comprising a cylindrical member having an annular groove in one face thereof and near one edge, and an annular member seated in said groove and fixed against rotation relative to the cylindrical member.

14. A braking flange comprising a cylindrical member having an annular groove in one face thereof and near one edge, and an annular member having spaced axially-extending apertures therein having one edge seated in said groove and fixed against rotation relative to the cylindrical member.

15. A composite brake drum comprising a cast iron drum part having a substantially elongated rectangular cross section with one edge and the outer adjacent surface finished and an inner finished cylindrical brake shoe-engaging surface, a drum head part having a smooth face and short axially extending flange finished to snugly engage against the edge and against the outer adjacent finished surface of the drum part, and means for securing the parts together, said flange extending continuously around the drum and strengthening the same against outwardly directed radial pressures and said drum part having substantially all of its outer surface exposed except the adjacent finished surface immediately under the short flange of the drum head 16. A rivet comprising a body portion and a shank portion extending at right angles thereto near the end of the body portion, said body portion and shank portion each being adapted to be upset to form a rivet head.

CHARLES G. KELLER.